(No Model.)

L. S. COPPER.
SADDLE SPRING FOR BICYCLES.

No. 350,868.          Patented Oct. 12, 1886.

Witness,
Ew Laird
G. H. Tibbitts

Inventor,
Luther S. Copper,
per Geo H Tibbitts atty

N. PETERS, Photo-Lithographer, Washington, D. C.

UNITED STATES PATENT OFFICE.

LUTHER S. COPPER, OF CLEVELAND, OHIO, ASSIGNOR OF ONE-HALF TO FRANK W. BOWLER, OF SAME PLACE.

SADDLE-SPRING FOR BICYCLES.

SPECIFICATION forming part of Letters Patent No. 350,868, dated October 12, 1886.

Application filed February 5, 1886. Serial No. 190,899. (No model.)

*To all whom it may concern:*

Be it known that I, LUTHER S. COPPER, of Cleveland, in the county of Cuyahoga and State of Ohio, have invented certain new and useful Improvements in Bicycle-Saddle-Supporting Springs, of which the following is a specification.

This invention relates to spring-supports for bicycle-saddles, and has for its object to provide for relief from the jar to the rider in going over rough roads or places, and the several parts comprising the same being made readily interchangeable.

The invention consists in combining with the upright arms of the seat-supporting framework of a bicycle of a saddle-supporting bar suspended at each end by means of loops removably attached to each end of said bar and attached to the aforesaid supporting-arms by means of peculiar clamps and sockets or sleeves in such a manner that the said bar may be readily applied and adjusted to render the movements of the bicycle more pleasant and agreeable to the rider by dispelling the unpleasant jolting.

Figure 1:
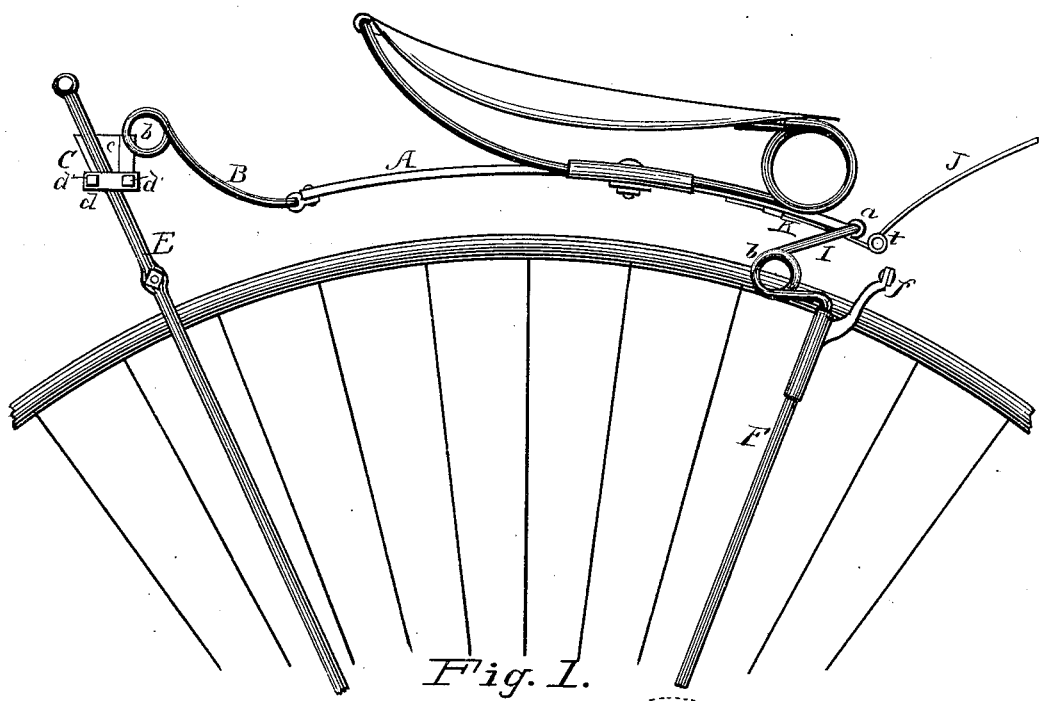
Figure 2:
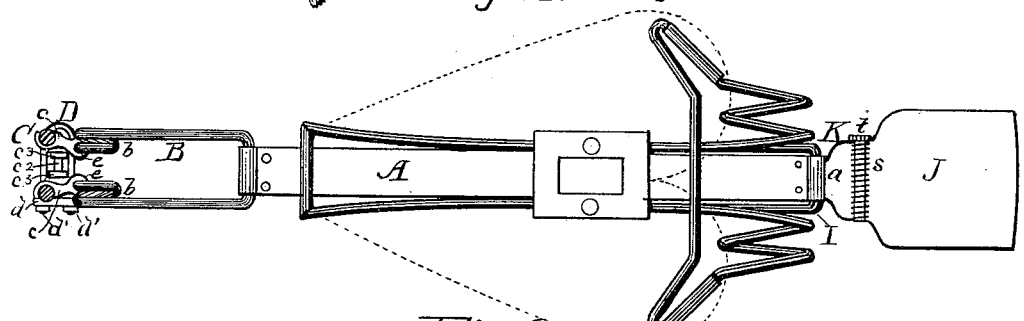
Figure 3:
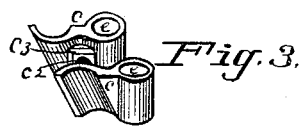
Figure 4:
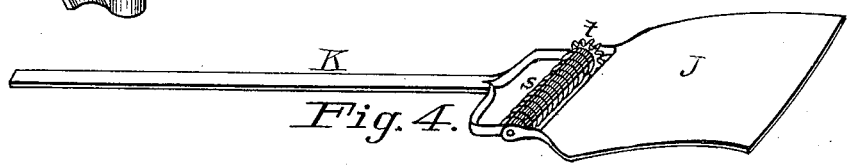

The accompanying drawings illustrate my invention, in which Figure 1 is a side elevation showing my improved saddle-support and the manner of applying it to the bicycle-frame. Fig. 2 is a top or plan view of the same. Fig. 3 is a detached and enlarged view of the clamp with sockets for holding the seat-support to the frame. Fig. 4 is a detached view of a mud-guard.

A is a bar of steel, to each end of which are attached, by bolts, clamps $a$ $a$, consisting of two leaves, forming an eye-piece.

B is a loop made of strong wire bent in the form shown, and is attached to the end of bar A by the said eye-clamp $a$. The ends of said loop may or may not have coils $b$ bent in them.

C is a clamp consisting of two leaves, $c$ $c$, having sockets or tubes $e$ $e$, into which the ends of the wire loop B are inserted. The ends of the wire may be secured in said sockets by means of nuts on lower side of the sockets; or the sockets may be screw-threaded and the wire screwed in them; but these are not necessary, as the wire will remain in them without liability to displacement. The two leaves $c$ $c$ of the clamp are joined together by a screw, $c^2$, having nuts $c^3$, by which the said leaves may be spread apart to adapt them to the two rods forming the forward support, E. The said leaves $c$ $c$ have grooves in their inside faces, fitting them to bear against the outside of the two rods of the support E. A horseshoe-shaped bolt, D, with a plate, $d$, and nuts $d'$ $d'$, bind the said clamp to the supporting-rods E.

To the rear supporting-rods, F, are attached sleeves $f$, into which the ends of a wire loop, I, similar to C, which is also attached to the rear end of the bar A by means of an eye-clamp, $a$. The said loop I may be turned to stand forward under the seat to be out of the way of other parts. The two rods forming the rear support, F, are joined at their upper ends by arms $f'$ on the sleeves $f$, joined together with a bolt over the bicycle-wheel.

To the rear end of the bar A is attached a mud-guard, G, consisting of a plate, J, attached by a hinge-joint to a sliding rod, K, fixed in suitable bearing on said bar A, whereby the said plate may be turned over and slid in under the seat when not wanted for use. The pintle of the hinge has a spiral spring, $s$, upon it bearing against a head, $t$, on the plate, the tension of which spring serving to hold the plate in any position it may be turned into, and prevent its being jarred out of such position by the movements of the bicycle.

Having described my invention, I claim—

1. The clamp C, consisting of two leaves, $c$ $c$, provided with sockets $e$ $e$ and joined together by the expanding screw and nuts $c^2$ $c^3$, and secured to the supporting-rods E with the bolt D, in combination with the loop B of the bar A, substantially as specified.

2. The combination, with the bar A, of a mud-guard, G, consisting of a plate, K, attached by means of a hinge-joint to a sliding rod, J, fixed to slide in suitable bearings on said bar A and provided with a tension-spring, $s$, bearing on a notched head, $t$, for holding and retaining the said plate in position, substantially as described.

LUTHER S. COPPER.

Witnesses:
E. W. LAIRD,
GEO. W. TIBBITTS.